United States Patent [19]

Gautreaux et al.

[11] 3,860,416

[45] Jan. 14, 1975

[54] MODIFIED ALUMINUM PROCESS

[75] Inventors: Marcelian F. Gautreaux; John H. McCarthy; Walter E. Foster; Donald O. Hutchinson; Frederick W. Frey, Jr., all of Baton Rouge, La.

[73] Assignee: Ethyl Corporation, Richmond, Va.

[22] Filed: Mar. 23, 1973

[21] Appl. No.: 344,213

Related U.S. Application Data

[63] Continuation-in-part of Ser. No. 277,383, Aug. 2, 1972.

[52] U.S. Cl. ........................... 75/0.5 B, 75/3, 75/11, 75/68 C, 75/123 L, 75/148, 423/417
[51] Int. Cl.... C22b 21/00, C22c 21/02, C22c 39/04
[58] Field of Search........ 277/383; 75/3, .5 B, .5 BB

[56] References Cited
UNITED STATES PATENTS

| | | | |
|---|---|---|---|
| 602,976 | 4/1898 | De Chalmot | 75/123 L |
| 2,755,178 | 7/1956 | Rasmussen | 75/148 X |
| 2,757,077 | 7/1956 | Lewis et al. | 75/0.5 AA |
| 3,112,179 | 11/1963 | Schmeckenbecher | 423/417 |
| 3,155,493 | 11/1964 | Tanaka et al. | 75/68 C |
| 3,535,108 | 10/1970 | Kobetz et al. | 75/68 C |

FOREIGN PATENTS OR APPLICATIONS

| | | | |
|---|---|---|---|
| 621,308 | 5/1961 | Canada | 75/148 |
| 696,759 | 10/1964 | Canada | 75/2 |

*Primary Examiner*—Allen B. Curtis
*Attorney, Agent, or Firm*—Donald L. Johnson; John F. Sieberth; Paul H. Leonard

[57] ABSTRACT

A process for producing aluminum from raw alumina ore, especially diaspore clay, including crushing and grinding a natural or raw mined diaspore clay to a desired particle size, beneficiating the clay to obtain a beneficiated diaspore product or mineral, compacting the beneficiated diaspore product along with a carbon reductant into agglomerates such as briquettes, pellets or other suitable form and to a desired size, carbothermically reducing the mineral compacts in an electric arc furnace into an aluminum-silicon alloy, comminuting the aluminum-silicon alloy into a desired particle size, hydroaluminating the aluminum-silicon alloy particles with hydrogen and propylene to form tripropylaluminum and dipropylaluminum hydride, pyrolyzing or decomposing the tripropylaluminum and dipropylaluminum hydride to form an aluminum powder, filtering, washing and drying the aluminum powder, and fluxing and casting the aluminum powder into pigs or other suitable form, thereby forming a substantially pure aluminum product. In a preferred process, slag from the aluminum purification process and fume produced from the carbothermic reduction of the beneficiated diaspore product in the electric arc furnace are transferred to the compaction operation, hydrogen and propylene produced in the decomposition phase are routed to the hydroalumination reaction, and oil from the washing and drying of the aluminum powder is circulated to the decomposition step.

In a most preferred process, the silicon rich residue from the hydroalumination reaction is conducted to a furnace wherein lime, silicon-dioxide and iron, if necessary, are added to produce ferro-silicon alloy.

13 Claims, 1 Drawing Figure

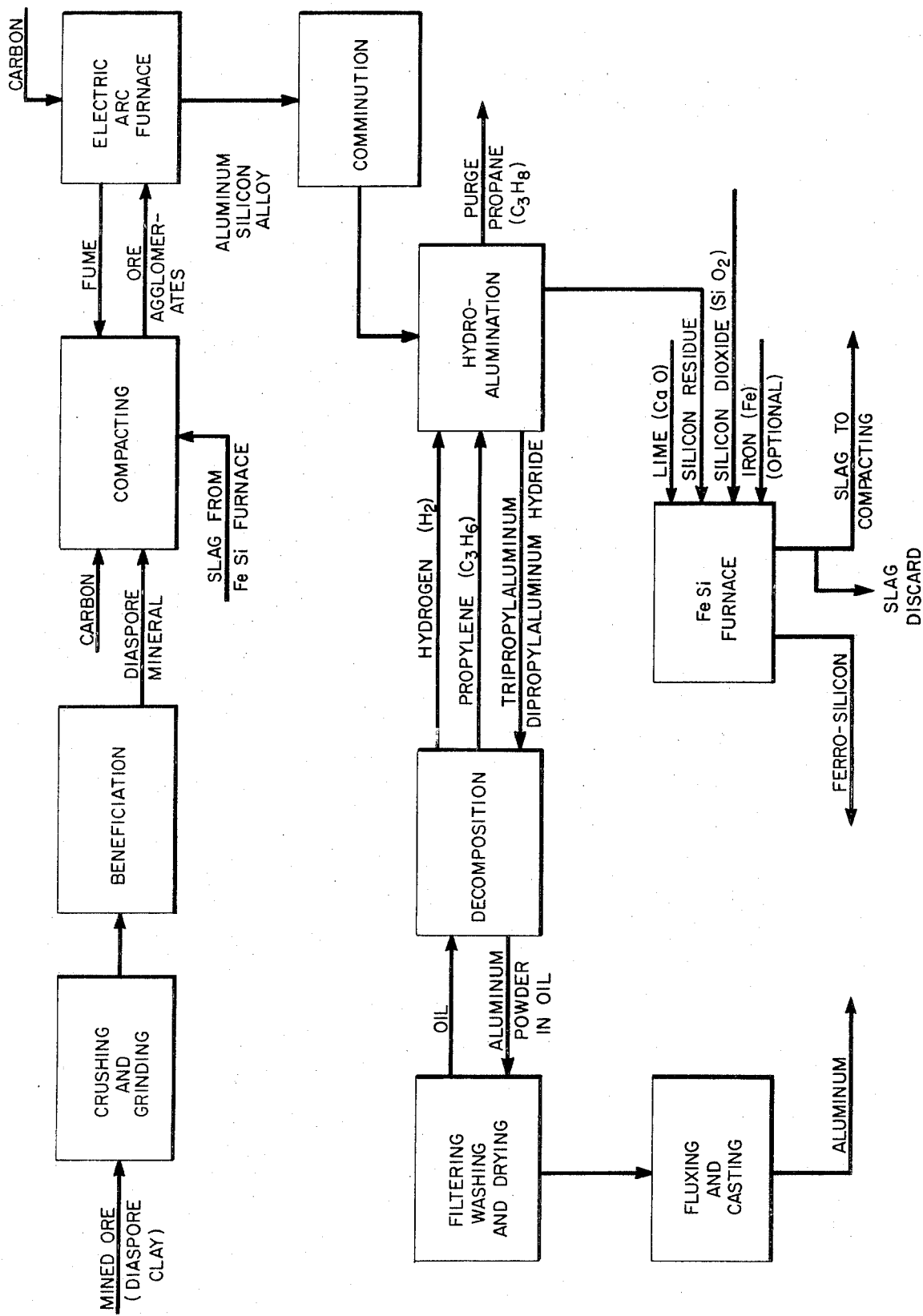

MODIFIED ALUMINUM PROCESS

CROSS-REFERENCE TO RELATED APPLICATION

This application is a continuation-in-part of U.S. application Ser. No. 277,383 filed on Aug. 2, 1972.

BACKGROUND OF THE INVENTION

The present invention is in the field of aluminum extraction and reduction and particularly relates to a direct-reduction process for producing aluminum from a raw or natural alumina ore such as diaspore clay.

For over 80 years, aluminum has been produced by the two-part Bayer-Hall process, wherein alumina ($Al_2O_3$) is first extracted from bauxite ore and the alumina is then electrolytically reduced in molten cryolite (sodium aluminum fluorides) to free aluminum metal. Although the process has been highly successful commercially it consumes large quantities of electricity and takes about four pounds of bauxite to produce one pound of aluminum. Bauxite comprises 45 to 60 percent aluminum oxide, 3 to 25 percent iron oxide, 2.5 to 18 percent silicon oxide, 2 to 5 percent titanium oxide, up to one percent other impurities, combined with 12 to 30 percent "water of crystallization." The ore varies greatly in the proportions of its constituents, and in color and consistency. Gibbsite, boehmite and diaspore are the hydrated aluminum oxide minerals normally found in bauxite.

The Bayer process for producing alumina basically involves a caustic leach at elevated temperature and pressure, followed by separation of the resulting sodium aluminate solution, and selective precipitation of the alumina. There are two principal variations of the process: (1) The European Bayer, in which the approximate conditions of leaching are at a pressure of 210 pounds per square inch, a temperature of 390°F., a caustic concentration of 400 grams per liter, and a digestion time of 2 to 8 hours to effect solution of the monohydrate mineral boehmite; and (2) The American Bayer, in which a pressure of about 60 pounds per square inch, a temperature of about 290°F., a caustic concentration of 170 grams per liter, and a digestion time of one-half to one hour are used to dissolve the trihydrate mineral gibbsite. In both processes, the pregnant solution is separated from the red mud tailings by countercurrent decantation and filtration. The liquor is cooled until it becomes supersaturated, then seeded with previously prepared hydrated alumina crystals. About one-half of the alumina in solution is precipitated in a 36 to 96 hour period. The precipitate is then filtered, washed and calcined at 2,000°F. to obtain the final product. Caustic soda is regenerated in the precipitation step and, together with the unprecipitated alumina, is recycled to the digesters.

The finely divided residue resulting from leaching contains $Fe_2O_3$, $TiO_2$ and a complex sodium aluminum silicate compound, the latter representing a loss of soda and alumina. The quantity discarded in the residue is related to the silica content of the bauxite. Approximately 1.1 units of alumina and 1.2 units of soda are lost for each unit of silica in the ore. For economic treatment, the bauxite must contain less than 8 percent silica. Approximately four long dry tons of bauxite are required to produce two short tons of alumina, which upon electrolysis yields slightly more than 1 short ton of aluminum. In addition to bauxite, the Bayer process requires soda ash, lime for causticizing the soda ash and fuel oil, gas or coal.

Some modifications of the Bayer-Hall process have been made in order to utilize bauxite ores containing 12 to 15 percent silica. In one such process the ore is first subjected to a Bayer leach. The resulting red mud, which contains a complex sodium aluminum silicate compound, is sintered with limestone and soda ash, then leached with water to recover alumina and soda. The brown mud residue has a composition, on a dry basis, somewhat similar to that of portland cement. This process requires additional costs in capital investment, raw materials and processing, and the upper limit of silica for use in the process is about 15 percent.

The average grade of bauxite ore used in the Bayer-Hall process has continually declined. In 1930 ore used in the U.S. averaged 60 percent alumina and by 1963, the average was less than 50 percent alumina. Although it is anticipated that this average will decrease to about 35 percent alumina in the future, the process is generally limited to the use of bauxite ore high in aluminum content. Domestic reserves of such high grade are totally inadequate to meet current production requirements.

Another disadvantage of the Bayer-Hall process is its necessity for an adequate, dependable and long-range supply of alumina requiring discovery of new sources of raw materials and the solution of numerous mining and metallurgical problems. Problems of the process include the need for improving efficiency and development of methods for utilizing tailings. Mechanical beneficiation of low-grade bauxites is hampered by the high loss of alumina in removing iron and silica. A need therefore exists for a direct reduction process that frees aluminum from crude feed material and which material is readily available.

In another process, alumina is extracted commercially from high-iron bauxites by the Pedersen smelting process. In this process, bauxite, limestone, coke and iron ore are smelted in an electric furnace to produce pig iron and a calcium aluminate slag containing 30 to 50 percent alumina. The slag is leached with sodium carbonate solution, and the alumina trihydrate is precipitated by carbon dioxide.

One prior art direct reduction process for producing aluminum has achieved some success in the laboratory, but has failed to achieve real commercial success. In this process, aluminum-containing metal feed, e.g., bauxite reduced with coke, is brought into contact at an elevated temperature with gaseous $AlCl_3$ (or the tribromide) and the gaseous subhalide (monochloride or monobromide) is cooled in a separate zone to break the gas down to aluminum trihalide and purified aluminum. Aluminum is recovered in a molten, substantially pure state. The aluminum trihalide is recirculated to produce additional mono-halide. Severe temperature conditions, problems of handling hot metal, and the corrosive nature of the gases create many difficulties in operating the process.

In another direct reduction process, bauxite is partially reduced with carbon in an electric furnace, then it is further reduced with carbon to produce a mixture of aluminum and aluminum carbides. The aluminum is separated and the aluminum carbide recycled. Little or no commercial success has been achieved with this process.

Many other methods of recovering aluminum have been proposed, none of which has been particularly successful. Such processes include the treatment of alumina with aluminum sulfide and carbon at an elevated temperature; hydrogen reduction of alumina at above 100 atmospheres and above 400°C.; reaction between alumina and aluminum carbide at 1,980°C.; and electrolytic reduction of complex organoaluminum compounds such as $NaF \cdot 2Al(C_2H_5)_3$.

Another process comprises chlorinating alumina containing materials in a reactor to yield aluminum trichloride and reacting the aluminum trichloride with manganese to yield aluminum and manganese chloride.

A process for carbothermic production of aluminum from aluminum oxide is disclosed in U.S. Pat. No. 3,607,221.

Direct smelting of aluminum-silicon alloys from clay has been investigated. High-purity clay is used to minimize contamination of the alloy by iron and titanium. An electric furnace has been used with a carbon reductant, which may be coke, coal, charcoal, sawdust, hogged fuel, or mixtures of these materials. At operating temperature, pure aluminum would volatize and react with oxides of carbon. This is prevented by the presence of silicon which alloys with the aluminum and reduces the amount of aluminum vapors that are produced. Further, the silicon preferentially reacts with any carbon which dissolves in the aluminum silicon alloy and prevents the formation of aluminum carbide which would be non-reactive in aluminum recovery operations.

Methods for recovering commercial-grade aluminum from aluminum-silicon alloys have also been investigated. Experimental procedures have included leaching the alloy with a molten metal such as zinc in which the aluminum dissolves and the silicon and impurities are relatively insoluble. The zinc is then distilled from the aluminum. In the subhalide process, a crude aluminum alloy is treated with $AlCl_3$ at approximately 1,000°C. to produce $AlCl$. The reaction is reversed by lowering the temperature; pure aluminum condenses and the $AlCl_3$ vapors are recycled.

The present invention is particularly adapted to overcome the disadvantages, problems and difficulties of these prior art processes.

It is a primary object of the present invention to provide a complete direct reduction process for producing aluminum from a natural or raw ore, such as diaspore clay, which is available domestically in commercial quantities.

Another object of the present invention is to provide a process for producing substantially pure aluminum which is more economical than prior art processes.

Still another object of the present invention is to provide a process for producing aluminum wherein little or none of the materials used therein is lost in processing.

A further object of the instant invention is to provide a new direct reduction process for aluminum which also provides a ferro-silicon alloy as a second principal product thereof.

Other objects and advantages of the invention will be readily apparent from a consideration of the description and drawings hereinafter.

SUMMARY OF THE INVENTION

The present invention provides a process for producing substantially pure aluminum from mined alumina ore, especially diaspore clay and comprises the following basic steps:

1. The mined diaspore clay is crushed and ground in suitable equipment to a particle size of about −100 mesh.

2. The ground diaspore clay is beneficiated to obtain the diaspore product or mineral. A magnetic separation is preferred for reducing iron oxides to about 3 percent $Fe_2O_3$. Calcination of the clay is also desirable for removing water of hydration and free water and for further reduction of the iron oxides. Chlorination is also desirable to decrease titanium content and further decrease the iron oxides. Sand containing little or no iron or titanium may be added to the beneficiated diaspore product to obtain a satisfactory ratio of alumina to silica. The particular beneficiation selected will vary with the type of ore.

3. The beneficiated diaspore product is then compacted into agglomerates. Briquettes of from about 1 inch × 1½ inches × ¾ inch to about 2 inches × 2 inches × 1 inch formed in suitable briquetting or like equipment utilizing suitable binders have been found to be particularly satisfactory. In some instances it may be desired to compact ore-carbon pellets, briquettes, or other suitable agglomerates.

4. The ore briquettes are then fed to an electric arc furnace along with a predetermined amount of carbon in the form of coal, coke, charcoal, and/or wood chips wherein the ore is carbothermically reduced to form an aluminum-silicon alloy. The carbon may also be introduced in the form of compactions with the ore. Additional carbon in a suitable form may be added as necessary.

5. The aluminum-silicon alloy is then comminuted to a particle size of from about 150 microns to about 10 microns. A powder with a medium particle size of about 100 microns is particularly desirable. The alloy may be cast and ground to the desired size, blown from the melt, or comminuted by water spray.

6. The aluminum-silicon alloy particles are transferred to a suitable reactor and treated with propylene and hydrogen and a sodium catalyst under desired temperatures and pressures to form tripropylaluminum (TNPA) and dipropylaluminum hydride (DNPAH). Some TNPA may be used to initiate the hydroalumination reaction.

7. The TNPA and DNPAH are pyrolyzed or decomposed in a suitable reactor to form aluminum powder, propylene and hydrogen. Some propane is produced in the pyrolysis and most of it is vented off and recovered. The recycle gas stream is compressed back to the hydroalumination reactor and propane is separated out during compression. Propylene and hydrogen purged from the process after they are reacted are transferred to the hydroalumination reactor.

8. The aluminum powder is filtered and washed with a light hydrocarbon or oil such as hexane and then dried and compacted into a desired form or shape. The diluent oil is separated from the wash and preferably recycled to the decomposition step. The process can also be ended here.

9. The aluminum powder compacts are then melted and fluxed with chlorine gas or metal chlorides and fluorides, and then cast into pigs, sows or other desired shapes. A flux comprised of sodium chloride, potassium chloride and cryolite is especially beneficial, but other suitable fluxes may be used. In gas fluxing, chlorine gas is bubbled into the molten metal. Preferably an inert gas carrier, such as nitrogen is used. A most preferred fluxing gas is chlorine plus carbon monoxide and nitrogen.

10. In the preferred form of the process, silicon residue, which is filtered from the hydroalumination product, is heated in a suitable furnace with calcium oxide, silicon dioxide and if needed, additional iron to produce a ferro-silicon alloy of a desired ratio of silicon and iron. The alloy is separated from slag and cast into chills, pigs, sows, or other desired shapes.

BRIEF DESCRIPTION OF THE DRAWING

The drawing illustrates a flow diagram of the complete process for producing pure aluminum and ferro-silicon alloy.

DESCRIPTION OF THE PREFERRED EMBODIMENT

In the preferred embodiment of the invention, after the raw diaspore clay which averages about 40–60% $Al_2O_3$, 7–37% $SiO_2$, 5–7% $Fe_2O_3$ and 3–6% $TiO_2$ by weight, is mined, it is transferred to a suitable crusher, such as a jaw crusher, wherein the raw clay is reduced to about −4 inches. The crushed clay is transferred to a secondary crusher and then to an open circuit wet ball mill. A closed circuit wet ball mill is used to reduce the clay to a final size of about minus 100 mesh.

The minus 100 mesh clay is then beneficiated if necessary for the removal of kaolin and quartz sand. High intensity magnetic separation is used to decrease the concentration of iron oxide to approximately 3 percent $Fe_2O_3$. Following initial beneficiation treatment, the diaspore mineral may be calcined in a rotary kiln to remove water of hydration and free water.

Residual iron species may be further removed by using high intensity magnetic separation and/or high temperature (about 900°C. to about 1,000°C.) chlorination of the diaspore mineral. Chlorination decreases the $TiO_2$ content of the beneficiated product to desirably low levels and also produces by-product $TiCl_4$. Recovery of chlorine from the iron chlorides formed during chlorination is preferred.

If the $Al_2O_3/SiO_2$ ratio in the beneficiated product is greater than about 1.8, it is desirable to add sufficient sand that is low in iron and titanium to lower the ratio to about 1.4 to 1.8.

In the beneficiation process, about 70% of the diaspore is recovered. The concentrate composition is normally about 60–70% $Al_2O_3$, 30–40% $SiO_2$, 0.5–1.0% $Fe_2O_3$ and 1–1.5% $TiO_2$, by weight.

After the beneficiated diaspore product is obtained, it is then briquetted to provide a suitable furnace feed. Pillow shaped briquettes of a size of about 2 inches by 2 inches by 1 inch are prepared. Agglomeration of the finely ground diaspore product is necessary for good furnace operation. In a preferred form of the process, fume from the electric arc furnace is recycled to the briquetting operation where it is used as a binder and subsequently fed back into the arc furnace. Slag from the furnace is also recycled to the briquetting operation. Reducing agents are mixed with the ore and slag prior to briquetting. Coke and coal fines are used. The fixed carbon in the reducing agents should supply about 90–110 percent of the theoretical carbon required to reduce the ore and preferably 95–105 percent. The fixed carbon content of the carbon feed is about 12 percent wood, 60 percent coal and 28 percent coke.

The briquettes or pellets are then transferred to an electric arc furnace for reduction to an aluminum-silicon alloy. Aluminum-silicon alloy is tapped from the furnace and cast into suitable molds.

The cast alloy is then comminuted to a conventional size for hydroalumination. The large castings may be transferred directly to a large crusher or impact mill where they are reduced to −6 inch lumps, or they may be broken up by a concrete breaker, jack hammer or other suitable equipment to lumps or pieces of about 6 inches. The small pieces of alloy are then submitted to secondary crushing techniques in conventional equipment until they are reduced to particles of about ¼ inch. Finally, the small particles of crushed alloy are fed to a ball mill and further reduced to about a −100 mesh powder. The ground alloy is then conveyed to a hydroalumination reactor for further processing. Care is taken to minimize oxygen exposure during the grinding operation, so that aluminum metal is not oxidized to $Al_2O_3$.

A tripropylaluminum (TNPA) hydroalumination process is used to separate aluminum from the silicon in the alloy. Hydroalumination may be carried out in a continuous process, wherein hydrogen and propylene and some TNPA and a suitable catalyst, e.g. sodium, are continuously introduced into a hydroalumination reactor along with a stream of alloy to produce tripropylaluminum (TNPA) and dipropylaluminum hydride (DNPAH). After a suitable residence time in the reactor TNPA and DNPAH product is filtered or centrifuged and is transferred to a pyrolysis or decomposition reactor. In a preferred hydroalumination step, several reactors are used with alloy being fed to the first one or two at a controlled rate under controlled conditions. Propane formed in the pyrolysis step, as well as during the hydroalumination operation, is vented and used for fuel. Depletion of free aluminum in the alloy is in excess of 90%. Preferably, silicon residue from the hydroalumination reaction is removed from the TNPA via suitable filtration, e.g., a horizontal leaf filter, and transferred to a furnace for making ferro-silicon alloy.

The pyrolysis or decomposition of the TNPA-DNPAH mixture is preferably carried out in a series of reactors in an inert hydrocarbon medium. Other suitable pyrolysis or decomposition processes may be used. Hydrogen and olefin (propylene) as well as by-product paraffin (propane) produced are transferred to the hydroalumination reactor. Propylene recovery is in excess of 90%. Most of the propane produced is vented off and recovered. The recycle gas stream is compressed back to the hydroalumination reactor and propane is separated out during compression.

Aluminum is produced in the form of powder in the oil slurry. The aluminum-oil mixture is filtered, with the aluminum being separated therefrom, washed with hexane and dryed. The oil or inert hydrocarbon and alkyl bottoms mixture is recycled to the pyrolysis reactor after flashing the hexane-oil-alkyl mixture. Substantially all of the hexane is recovered.

The hexane-wet aluminum powder is dried in any suitable manner, e.g., in steam-tube dryers. Vaporized liquids are condensed and recycled to the wash recovery operation. Oxygen exposure of the fresh aluminum surface is minimized during the washing and drying operations.

The dry aluminum powder is briquetted and fed to a conventional melting furnace. Fluxing is desirable and a flux composition of 60% sodium chloride and 40% cryolite, by weight, produces excellent results. A gas flux, such as chlorine, or any other suitable flux may be used. Molten pure aluminum from the melting furnace is cast into suitable ingots. A direct chill ingot casting machine is preferable, but other casting apparatus may be used.

In the preferred process of this invention, ferro-silicon alloy is also produced as co-product. Silicon residue powder from the filtration or centrifugation of the TNPA is mixed with iron, normally in the form of steel turnings, quartz and limestone and fed into a slag resistance furnace or other suitable furnace to produce a ferro-silicon alloy. Molten ferro-silicon alloy is tapped from the furnace periodically and cast into suitable containers for further handling as desired. Slag produced from the ferro-silicon furnace is also cast and subsequently crushed to particles of about −1 inch. The crushed and ground slag is then preferably recycled to the kyanite briquetting plant, but may be disposed of if desired.

The hydroalumination reaction for producing aluminum alkyls is exothermic and some of the simultaneous reactions proceed at a faster rate than others. The reaction also produces paraffins. In a commercial operation, it is necessary that the rate of reaction be sufficiently fast to minimize the size of equipment needed and to reduce paraffin formation.

Some aluminum alkyls decompose cleanly during pyrolysis while others do not. Some produce considerably more carbides than others, and some produce quantities of undesirable by-product olefins and paraffins.

In comparison of TNPA with triethylaluminum (TEA), hydroalumination is faster with TEA and less paraffins are produced. TEA, however, does not decompose cleanly, produces more carbides and produces substantial amounts of butenes during decomposition or pyrolysis.

In comparison of TNPA with triisobutylaluminum (TIBA), hydroalumination reaction rates and paraffin formation on a molar basis are about the same. Since, however, the molecular weight of TIBA is greater than that of TNPA, more pounds of paraffin are formed per pound of aluminum produced. Olefin losses are higher with TIBA than TNPA. Although TIBA decomposes fairly cleanly, carbide production is somewhat greater with TIBA than when TNPA is used.

From the above considerations, TNPA is the preferred intermediate, over TEA and TIBA, in the aluminum process described herein.

This invention is particularly directed to the use of alumina ores which contain substantial amounts of aluminum and silicon. Economically, the raw ore should contain at least 20% of a diaspore mineral. For simplification and purposes herein, a diaspore clay is defined as any alumina ore which contains 20% or more by weight of a hydrated alumina mineral, such as diaspore, plus alumina-silicate minerals. Under some circumstances, a raw clay containing as little as 15% hydrated alumina might be suitable. A diaspore mineral or beneficiated diaspore product is defined as a diaspore clay which has been beneficiated to remove substantial amounts of impurities or materials other than diaspore.

The foregoing disclosure and description of the invention is illustrative and explanatory thereof and various changes may be made in the details of process within the scope of the appended claims without departing from the spirit of the invention.

What is claimed is:

1. A process for producing substantially pure aluminum from a raw diaspore clay, comprising, in sequence, the steps of:
    a. comminuting the raw diaspore clay into particles about minus 100 mesh in size, beneficiating the ore particles to remove kaolin and quartz sand, and magnetically separating iron species to decrease the concentration of iron oxide in the clay to approximately 3 percent or less $Fe_2O_3$ to form a particulated diaspore mineral;
    b. agglomerating the particulated diaspore mineral into ore compactions of a predetermined size and shape;
    c. carbothermically reducing the ore compactions in an electric arc furnace to produce an aluminum-silicon alloy and effluent fume, and recycling said effluent fume to the agglomerating step;
    d. comminuting the aluminum-silicon alloy to a particle size of about minus 100 mesh;
    e. hydroaluminating the particulated aluminum-silicon alloy utilizing propylene, hydrogen and a sodium catalyst to form tripropylaluminum and dipropylaluminum hydride and leave a silicon residue, heating said silicon residue in a furnace with calcium oxide, silicon dioxide and iron as needed to produce a ferro-silicon alloy of a desired ratio of silicon and iron and a quantity of slag, separating the ferro-silicon alloy from the slag and casting it into a desired shape; and
    f. pyrolyzing the mixture of tripropylaluminum and dipropylaluminum hydride in an inert hydrocarbon diluent to produce substantially pure aluminum powder, propylene and hydrogen, recovering the propylene and hydrogen and transferring them to the hydroaluminating step.

2. The process of claim 1, including the addition step of:
    h. compacting the aluminum powder into a desired form, melting the aluminum powder compacts in the presence of a fluxing agent and casting the molten aluminum metal into a desired shape, thereby forming a substantially pure casting of aluminum metal.

3. The process of claim 1, wherein the slag produced from the ferro-silicon furnace is comminuted to a desired particle size and recycled to the agglomerating step (b) of claim 1.

4. The process of claim 1, wherein the diaspore is also calcined.

5. The process of claim 1, wherein the agglomerates are pillow shaped briquettes of a size of about 2 inches by 2 inches by 1 inch.

6. The process of claim 1, wherein the ore compactions are fed into the electric arc furnace with an amount of carbon of from about 90% to about 110% of the theoretical carbon necessary for effective reduction of the ore compactions.

7. The process of claim 6, wherein the carbon feed, comprises coal, coke and wood.

8. The process of claim 7, wherein the fixed carbon content of the carbon feed is about 12% wood, 60% coal and 28% coke.

9. The process of claim 6, wherein the carbon feed is coke.

10. The process of claim 6, wherein the carbon feed is a mixture of coke and coal.

11. The process of claim 1, wherein the molten aluminumsilicon produced in the electric arc furnace is periodically tapped therefrom and cast into a desired shape.

12. The process of claim 1 in which the ratio of $Al_2O_3$ to $SiO_2$ in the beneficiated ore is held to not more than 1.8.

13. The process of claim 12 in which the ratio of $Al_2O_3$ to $SiO_2$ is adjusted to between 1.4 and 1.8 by the addition of sand low in iron and titanium.

* * * * *